June 4, 1935.  J. C. GORDON  2,003,589

APPARATUS FOR TREATING LIQUIDS

Filed July 15, 1933  2 Sheets-Sheet 1

INVENTOR
Joseph C. Gordon.
BY
ATTORNEY

June 4, 1935. J. C. GORDON 2,003,589
APPARATUS FOR TREATING LIQUIDS
Filed July 15, 1933   2 Sheets-Sheet 2
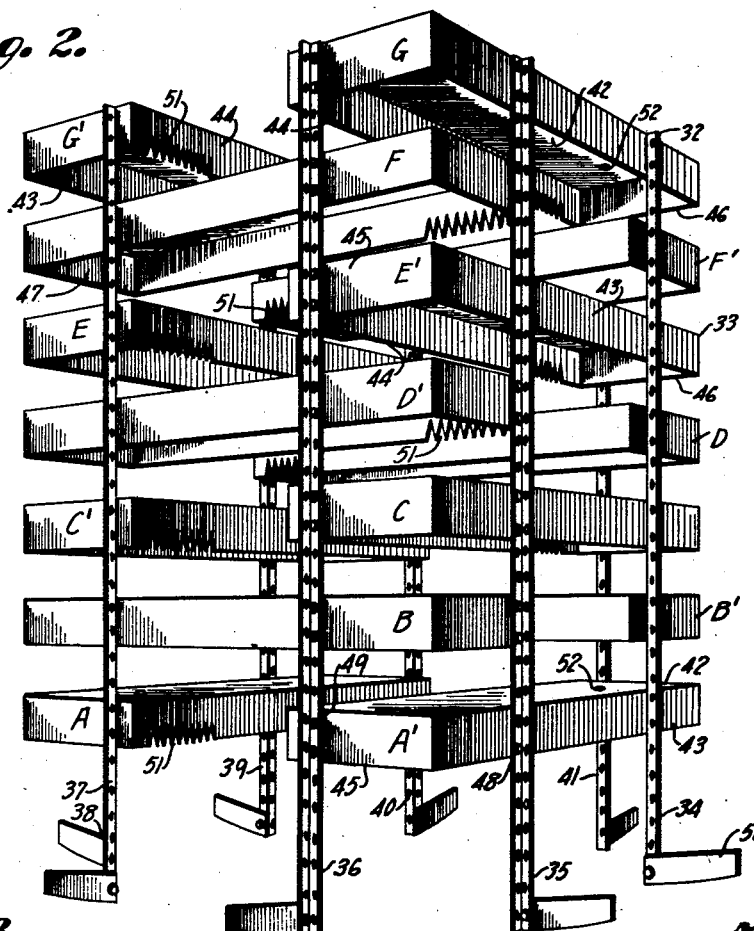
INVENTOR
Joseph C. Gordon
BY
ATTORNEY Patented June 4, 1935

2,003,589

UNITED STATES PATENT OFFICE 2,003,589

APPARATUS FOR TREATING LIQUIDS

Joseph C. Gordon, Oklahoma City, Okla., assignor to Black, Sivalls & Bryson, Inc., Oklahoma City, Okla., a corporation of Delaware Application July 15, 1933, Serial No. 680,522

6 Claims. (Cl. 210—48)

REISSUED

My invention relates to an apparatus for treating liquids and more particularly the fluid flow from an oil well where water is present in association with oil either in free state, or in various degrees of emulsion, and has for its principal object to efficiently and economically dehydrate the oil.

While the original flow from an oil well may be free from water and it is only necessary to separate contained gas from the oil, practically all wells sooner or later gradually produce water along with oil and gas owing to encroachment of water into the oil bearing strata or disintegration of the water shut-offs from upper water containing stratum. The ratio of oil and water flow, as well as the nature of their association, will vary through the life of the well and it is, therefore, a further object of the invention to provide a separating apparatus equipped to handle flow from the well throughout the characteristic changes of the fluid.

Water and oil associated together become, in many cases, badly emulsified as they enter the well and are propelled to the top. An emulsified mixture of water and oil that takes place at the entrance to the well, during passage through the well, at the valves at the head of the well, or elsewhere, is so tight an emulsion that the two liquids conform and are not separated, no matter how long they are settled. In such cases chemicals and/or heat must be applied to the emulsion in order to break it up. It is a further object of the invention to form a treating or reacting chamber wherein the heat and/or chemicals may act on the emulsion to break it up and allow separate discharge of the oil and water.

In accomplishing these and other objects of the invention, I have provided improved details of structure, the preferred form of which is illustrated in the accompanying drawings, wherein:

Fig. 2 is an enlarged detail perspective view of the baffle unit for controlling flow of the fluid in effecting dehydration of its water content.

Fig. 3 is a cross sectional view through the upper end of the oil and gas separator portion of the apparatus, particularly illustrating the spray condenser for eliminating liquid spray carried by the gas that has been separated from the flow.

Fig. 4 is a similar cross sectional view through the liquid and gas separator unit, particularly illustrating the tangential inlet of the fluid to be treated.

Fig. 5 is a side elevational view of the float control chamber through which surplus water is discharged from the separating apparatus, a part of the cover plate being broken away to better illustrate the float and valve arrangement.

Figure 1:
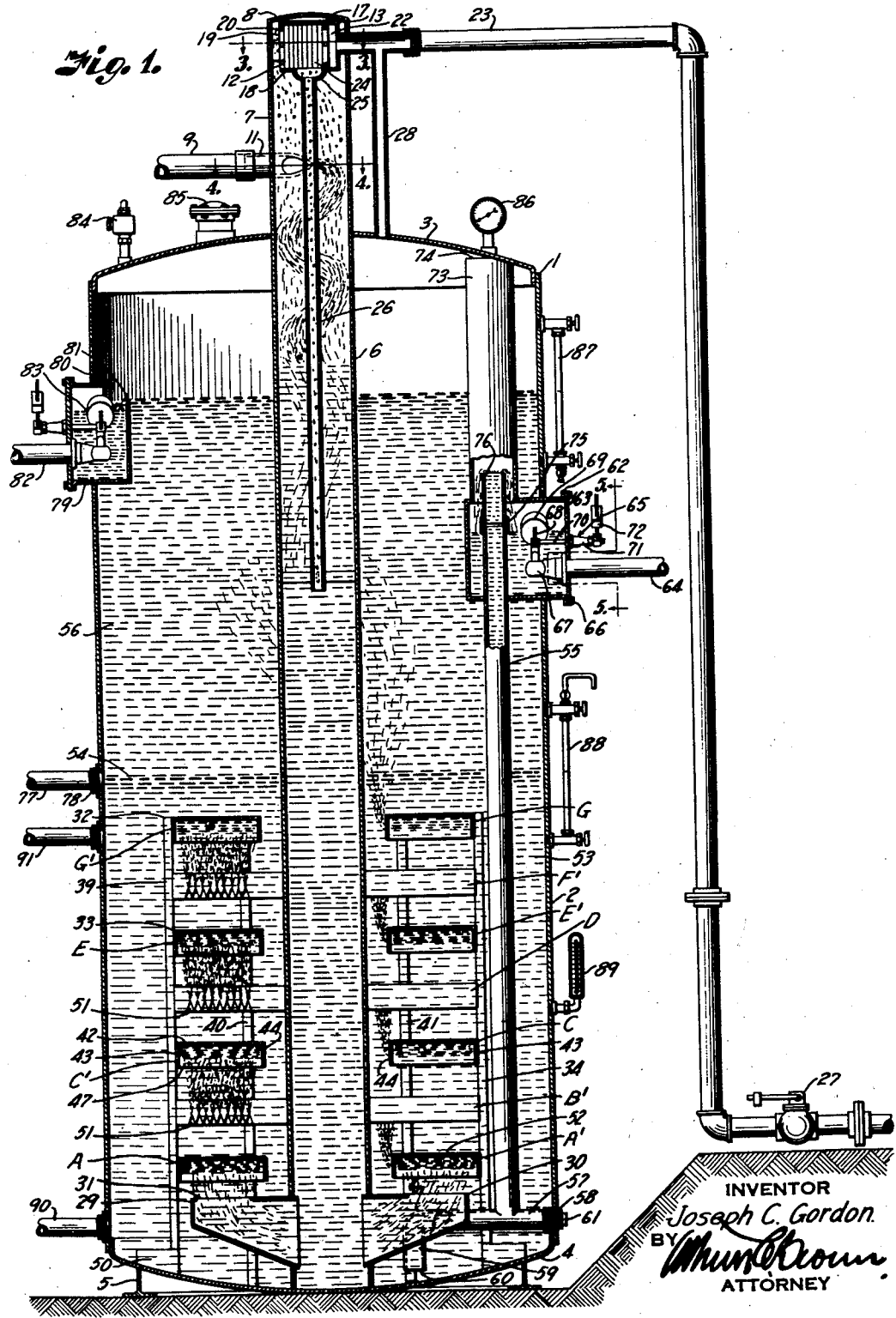
Fig. 1 is a vertical sectional view through a separating apparatus constructed in accordance with my invention.

Referring more in detail to the drawings:

1 designates a flow treating or separating tank including a vertically arranged cylindrical wall 2 closed at the top by a crown shaped end 3 and at the bottom by a downwardly curved end 4 provided with foot members 5 whereby the tank is supported in vertical position at a point adjacent a flowing well (not shown).

Extending axially within the tank is a conductor pipe 6 having its lower end secured to the bottom 4 while its upper end projects upwardly through the center of the top 3 to form an oil and gas separating tower portion 7, the top of the tower being closed by a suitable cover 8.

The entire flow of fluid from the well head, not shown, is delivered to the treating tank through a conduit 9 connected to a tangentially arranged inlet connection 11 on the tower portion 7 at a point spaced above the top of the tank 3 so that the fluid is discharged tangentially of the tower and is caused to whirl around the inner face thereof and to move in a series of spirals toward the bottom of the conductor pipe.

This whirling action of the fluid causes the gas to be crowded toward the center of the tower while the liquid is moved outwardly to effect separation, the liquid gravitating to the bottom of the conductor pipe, and the gas rising in the tower toward the closed end 8 where it passes through a spray condenser 12 wherein any of the spray that may be carried with the gas is removed and returned as a liquid to the bottom of the conductor pipe.

The spray extractor is best illustrated in Fig. 3 and is shown as including a substantially rectangular housing 13 having spaced side walls 14 and 15 connected by an end wall 16 and top and bottom walls 17 and 18 to leave an open side 19 opposite to the end wall 16 through which the gas is admitted to the interior of the extractor. Extending between the side walls 14 and 15 are rods 20 carrying spaced baffles or division plates 21 terminating short of the end wall 16 to provide an outlet passageway 22 for the gas which is discharged through a lateral pipe 23 extending through the wall of the tower 7.

In order to retard flow of gas between the division plates 21 to cause it to give up the spray that may be carried thereby, the division plates and the inner faces of the walls 14 and 15 are provided with a series of baffles 24 arranged in staggered relation so that the gas moves through a tortuous path in contact with the extensive surfaces of the baffles. The spray condenses upon the baffles 24 and gravitates to a sump 25 that is formed in the bottom 18 of the housing and through a discharge conduit 26 extending downwardly in the center of the tower 7 to a point below the liquid level carried in the conductor pipe.

Flow of gas from the separator through the gas discharge conduit 23 is regulated by an automatically operating gas valve 27 capable of being set to operate at the predetermined pressure which is to be maintained in the tower 7. In order to equalize the gas pressure in the tower 7 with the pressure in the top of the tank 1, I provide a pressure equalizing pipe 28 having its ends communicating with the discharge pipe 23 and the top of the tank 1 respectively.

The liquid separated in the tower portion 7 is discharged from the lower end of the pipe 6 through oppositely directed outlet nozzles 29 and 30 having discharge openings 31 arranged to direct flow of the liquid upwardly within the tank 1 in two parallel streams, as clearly shown in Fig. 1, where it flows through a baffle unit 32 to give up its water content, as now to be described.

The baffle unit 32 includes a plurality of inverted pans 33 arranged in superimposed spaced relation in the tank in the form of a hollow square, so that the ends of the pans on opposite sides of the square overlap adjacent ends of the pans on the remaining sides of the square, as clearly shown in Fig. 2. The overlapping portions of the respective pans are retained in vertical spaced relation with each other by pairs of vertical angle-shaped legs 34—35, 36—37, 38—39, and 40—41.

Each of the pans are preferably of elongated rectangular shape and includes a horizontal top plate 42 connecting spaced depending sides 43 and 44 and ends 45 and 46 provide an open bottom pocket 47 under the top plate 42. The first pair of pans designated A, A' at opposite sides of the square are arranged in horizontal relation and the side walls 43 are secured to the pairs of legs 34—35 and 38—39, respectively, by bolts 48 extending through suitable openings in flanges of the legs and through openings in the sides of the pan, as clearly shown in Fig. 2. The ends of the pans A and A' are also supported by the pairs of legs 36—37 and 40—41, respectively, by similar fastening devices 49 extending through the ends 45 and 46 of the pans.

The next upper pair of pans B and B' are arranged at the opposite sides of the square with their longitudinal side walls secured to the pair of legs 36—37 and 40—41, while their ends are secured to the pairs of legs 38—39 and 34—35, respectively.

The next upper pair of pans C and C' are supported in spaced relation above the ends of the pans B and B' in the same relative relation as the pans A and A'. The next upper pair of pans D and D' are arranged in corresponding relation with the pans B and B' while the next set of pans E and E' are arranged similarly to the pans A and A' and C and C'. The remaining pairs of pans F and F' and G and G' are similarly arranged to complete the baffle unit.

In order to space the unit centrally within the tank 1, with the conductor pipe depending within the inner hollow square formed by the pans, the lower ends of the pairs of legs just described are secured to plates 50 adapted to be attached to the bottom 4, as shown in Fig. 1.

The inner side walls at one end of each pan is provided with a series of V-shaped notches 51 extending therealong at a distance somewhat less than the width of the pan directly above to form outlets for movement of the liquid from baffle to baffle, as later described.

In order to prevent air from being trapped under the pans, each plate 42 is provided with an aperture 52 preferably located at the same end as the notches 51.

The baffle unit just described is submerged in a body of water 53 carried in the bottom of the tank and extending to a point above the top set of baffles G and G', as indicated by the heavy dotted lines 54, Fig. 1.

The height of water is maintained at a predetermined level by a hydrostatic head of water carried in the discharge pipe 55 which is arranged to counterbalance the body of separated oil 56 carried above the body of water 53.

The water discharge or overflow pipe 55 is preferably arranged vertically within the tank 1 adjacent the inner side wall 2 thereof and has its lower end connected to a horizontal pipe section 57 having one end fixed in an opening 58 in the tank wall and its opposite end provided with a depending L 59 having its inlet 60 located just above the bottom of the tank at its lowest point.

The opening 58 is normally closed by a plug 61 which may be removed from time to time to clean out the overflow pipe or to drain the fluid from the tank.

The upper end of the overflow pipe extends through a float chamber 62 that is mounted in the wall 2 at a point above the water level 54 and which includes a rectangular shaped housing having one side projecting beyond the wall 2 and closed by a removable plate 63 carrying an outlet pipe 64 and a valve lever mechanism 65, the plate being secured to the float housing by suitable fastening devices 66, as best illustrated in Fig. 5.

The inlet of the pipe 64 is provided with a suitable valve 67 that is operable by a float lever 68 in response to movement of a float 69, the float lever 68 being connected with the valve 67 through suitable linkage, as shown in Fig. 5, and the lever 68 is pivotally mounted on a rock shaft 70 rotatably mounted in a bearing bracket 71 carried by the plate 63.

The rock shaft 70 projects from the bearing bracket and carries a weighted lever arm 72 for approximately counterbalancing the weight of the float and to indicate the relative position of the float exteriorly of the tank.

Connected with the top of the float chamber and extending upwardly within the tank 1 to engage the top 3 is a gas equalizer pipe 73 having an open upper end 74 through which the pressure in the float chamber is equalized with the pressure carried in the tank 1 and in the oil and gas separator tower 7.

In order to adjust the hydrostatic head of the column of fluid carried in the overflow pipe 55, the upper end of the overflow pipe terminates within the valve chamber and is provided with a coupling 75 for attaching variable length pipe nipples 76 to provide the desired height for the column of fluid to maintain the water level at a point above the top of the baffle unit and in alignment with a bottom sediment discharge pipe 77 that is connected in an opening 78 in the side wall 2 preferably at a point opposite to the overflow pipe.

The body of separated oil 56 carried above the body of water overflows into a float chamber 79 which is mounted in the side wall of the tank similarly to the float chamber previously described and which is provided with a notched opening 80 formed in the housing to provide a weir 81 for maintaining a fixed height of liquid in the tank.

The oil, upon overflowing into the float chamber is discharged through a pipe 82 under control of a valve operated by a float 83, similar to the float mechanism previously described.

In order to insure that the pressure in the tank 1 does not greatly exceed a predetermined pressure, as set by the gas valve 27, the top of the tank carries a pop valve 84 set to discharge at a pressure above the set pressure of the valve 27, and to relieve the tank in case of sudden increases in pressure beyond the capacity of the pop valve, as in the case of sudden gush of fluid through the inlet pipe 9, the top of the tank is also provided with a frangible diaphragm 85 having ample outlet capacity to prevent explosion of the tank.

The tank may also be provided with suitable fittings such as a pressure gauge 86, sight gauges 87 and 88, through which the respective liquid levels may be observed, and a thermometer 89 for indicating the temperature of the body of wash water contained in the bottom of the tank.

In order to heat the body of water 53 to reduce the viscosity of the liquid and aid in its dehydration, the tank may be provided with an outlet pipe 90 located adjacent the bottom and a water inlet pipe 91, by which the water may be passed through a suitable water heater, not shown.

In operating an apparatus constructed and assembled as described, the tank is filled with water to the level of the pipe 77.

The flow pipe 9 is then connected to the flow head of the well so that when the flow head is open a discharge from the well will flow through the pipe 9 for tangential discharge into the oil and gas separator portion of the tower 7.

The oil and water will whirl about the wall of the tower to crowd the lighter gas to the center of the tower which rises for passage through the spray condenser. When the gas moves through the spray condenser, any spray carried by the gas will be gravitated therefrom and returned through the pipe 26 to the lower end of the conductor pipe.

The liquid is discharged from the lower end of the conductor pipe in divided streams through the nozzles 29 and 30 which are located directly under the lower baffles A and A'. Upon discharge from the nozzles, the liquid being of lighter specific gravity than the wash water, gravitates upwardly therethrough until it is stopped by the lower surface of the plates 42 of the baffles A and A'.

The liquid will then travel along the surface of the plates and accumulate thereunder until it is of sufficient depth to trickle from the notches 51 when it will again rise upwardly through the body of water until stopped by the baffles B and B'.

The liquid will then flow along the baffles B and B' toward the notches 51 therein from whence it will again rise to be stopped by the baffles C and C' and so on up the tower of baffles until the streams of oil emerge from the notches 51 in the upper baffles G and G'.

The oil, after passing through the body of wash water will collect in the upper end of the tank until it has attained sufficient volume to flow over the weir 81 into the flow chamber 79 from where it will be discharged through the pipe 82 by the action of the float 83 when the level in the float chamber reaches the predetermined value set by the float.

It is thus apparent that the liquid ascends in two separate spirals and that it will ascend very slowly due to the arrangement of the baffles 10 whereby the bodies of oil are retained a sufficient time to permit thorough treatment and soaking.

If it is found necessary, the viscosity of the liquid may be reduced by treating the body of water upon connecting the pipes 91 and 90 with a suitable heater.

In case of emulsified liquids it may be desirable to add a chemical to the wash water for chemically reacting with the emulsion to effect dehydration as the liquid gravitates from baffle to baffle between the soaking periods, wherein the chemical has time to act on the emulsion to effect release of the water content.

The thoroughness with which the baffles automatically expose oil in thin layers between the bubbling stages causes a marked saving in chemicals and in heat necessary for the body of treating water.

As the separated water accumulates, the excess is discharged from the pipe 55 into the float chamber 62 from where it is discharged through the pipe 64 under control of the float 69.

From the foregoing it is apparent that the pan baffle arrangement prolongs the washing action of the oil and assures settlement of the water after the emulsion is broken so that only dehydrated oil rises to the top of the tank for flow therefrom.

It is also apparent that a device constructed as described is an all purpose piece of equipment which can be put on a well when the well is first brought in, at which time the fluid from the well contains only oil and gas, and the device is used simply as a separator to separate oil from gas, but the device will be ready without alteration to perform the treating function when water appears.

What I claim and desire to secure by Letters Patent is:

1. In an apparatus for separating liquids in a closely associated state including a tank containing a body of treating liquid, means for delivering the associated liquids to the treating liquid for gravitational flow therethrough, and a superimposed series of inverted and elongated pan members supported in the tank, each including a top plate having depending sides to form downwardly opening channels in the path of the gravitational flow to detain and confine a definite body of the liquids for movement longitudinally through the respective channels in one direction and having a series of outlets in the lower edges of one of the sides near the ends of said channels to allow flow of the liquids from a lower channel to a superimposed upper channel and along said upper channel for escape through said outlets in the side of the pan member forming said upper channel.

2. In an apparatus for separating liquids in a closely associated state including a tank containing a body of treating liquid, means for delivering the associated liquids to the treating liquid for gravitational flow therethrough, a superimposed series of inverted and elongated pan members having depending sides, and means supporting the pan members in the tank with an end of one pan member overlying the opposite end of a superimposed pan member to form vertically spaced downwardly opening channels in the path of the gravitational flow to confine definite bodies of the liquids for movement longitudinally through the respective channels in one direction, said pan members having outlets in the lower edge of one of the sides at the end thereof below the overlying end of a superimposed channel for escape of the liquids from one channel to a superimposed channel.

3. In an apparatus for separating liquids in a closely associated state including a tank containing a body of treating liquid, means for delivering the associated liquids to the treating liquid for gravitational flow therethrough, a superimposed series of inverted and elongated pan members having depending sides, and means supporting the pan members in the tank in the form of a hollow square with an end of one pan member overlying the opposite end of a superimposed pan member to form vertically spaced downwardly opening channels in the path of the gravitational flow to confine definite bodies of the liquids for movement longitudinally through the respective channels in one direction, said pan members having outlets in the lower edge of one of the sides at the end thereof below the overlying end of a superimposed channel for escape of the liquids from one channel to a superimposed channel.

4. In an apparatus for separating liquids in a closely associated state including a tank containing a body of treating liquid, means for delivering the associated liquids to the treating liquid for gravitational flow therethrough, and a superimposed series of inverted and elongated pan members supported in the tank, each including a top plate having depending sides to form downwardly opening channels in the path of the gravitational flow to detain and confine a definite body of the liquids for movement longitudinally through the respective channels in one direction and having a series of notches in the lower edges of one of the sides near the ends of said channels to allow flow of the liquids from a lower channel to a superimposed upper channel and along said upper channel for escape through said notches in the side of the pan member forming said upper channel.

5. In an apparatus for separating liquids in a closely associated state including a tank containing a body of treating liquid, means for delivering the associated liquids to the treating liquid for gravitational flow therethrough, a superimposed series of inverted and elongated pan members having depending sides, and means supporting the pan members in the tank in superimposed horizontal pairs with the ends of one pair underlying the opposite end of a superimposed pair to form vertically spaced downwardly opening channels in the path of the gravitational flow to confine definite bodies of the liquids for movement longitudinally through the respective channels in one direction, said pan members having outlets in the lower edge of one of the sides at the end thereof below the overlying end of a superimposed channel for escape of the liquids from one channel to a superimposed channel.

6. In apparatus for separating liquids in a closely associated state including a tank containing a body of treating liquid, means for delivering the associated liquids to the treating liquid for gravitational flow therethrough, an inverted and elongated pan member supported in the tank including a top plate having depending sides to form a downwardly opening channel submerged in said treating liquid in the path of the gravitational flow to detain and confine a definite body of said liquids for movement longitudinally of said channel and having a vent opening in the plate and a series of notches in the lower edges of one of the sides at the end of the channel to allow escape of the liquids to complete their gravitational flow through the treating liquid.

JOSEPH C. GORDON.